(12) United States Patent
Germain

(10) Patent No.: US 9,496,917 B2
(45) Date of Patent: Nov. 15, 2016

(54) ACCUMULATING DATA VALUES

(71) Applicant: ST-Ericsson SA, Plan-les-Ouates (CH)

(72) Inventor: Arnaud Germain, Nivelles (BE)

(73) Assignee: ST-ERICSSON SA, Plan-les-Ouates (CH)

( * ) Notice: Subject to any disclaimer, the term of this patent is extended or adjusted under 35 U.S.C. 154(b) by 326 days.

(21) Appl. No.: 14/240,576

(22) PCT Filed: Sep. 28, 2012

(86) PCT No.: PCT/EP2012/069245
§ 371 (c)(1),
(2) Date: Feb. 24, 2014

(87) PCT Pub. No.: WO2013/050306
PCT Pub. Date: Apr. 11, 2013

(65) Prior Publication Data
US 2014/0219320 A1    Aug. 7, 2014

Related U.S. Application Data

(60) Provisional application No. 61/544,448, filed on Oct. 7, 2011.

(30) Foreign Application Priority Data
Oct. 5, 2011  (EP) .................................. 11184027

(51) Int. Cl.
G06F 7/50     (2006.01)
H04B 1/709    (2011.01)
(Continued)

(52) U.S. Cl.
CPC .............. *H04B 1/709* (2013.01); *G01S 19/30* (2013.01); *G06F 7/503* (2013.01); *G06F 7/5095* (2013.01);
(Continued)

(58) Field of Classification Search
CPC .................................. H04B 1/709; G01S 19/30
(Continued)

(56) References Cited

U.S. PATENT DOCUMENTS 3,551,665 A * 12/1970 Powers ................... G06F 7/485
                                                          708/505
4,379,338 A *  4/1983 Nishitani .............. G06F 7/5095
                                                          708/552
(Continued)

FOREIGN PATENT DOCUMENTS

EP   0 115 004 A1   8/1984
JP   6-197012 A     7/1994
(Continued)

OTHER PUBLICATIONS

International Search Report issued in corresponding International application No. PCT/EP2012/069245, date of mailing, Nov. 20, 2012.
Neschen, Martin, "A Scalable Bit Sequential SIMD Array for Nearest-Neighbor Classification using the City-Block Metric," International Conference on Application Specific Array Processors, 1994 Proceedings, San Francisco, CA, USA, Aug. 22-24, 1994, Los Alamitos, CA, USA, IEEE Comput. Soc., pp. 369-380, XP010100241, DOI: 10.1109/ASAP.1994.331788, ISBN: 978-0-8186-6517-2.

*Primary Examiner* — Tan V. Mai
(74) *Attorney, Agent, or Firm* — Patent Portfolio Builders PLLC

(57) ABSTRACT

An accumulation apparatus, which adds a number of data values, has an adder and an asynchronous ripple counter. The adder adds each current data value to an adder sum of the preceding data values. The asynchronous ripple counter, which is coupled to the adder, generates a ripple count by counting occurrences of overflow of the adder. The accumulation apparatus outputs an accumulated data value having the adder sum as least significant part and the ripple count as most significant part.

19 Claims, 12 Drawing Sheets

(51) Int. Cl.
  *G01S 19/30* (2010.01)
  *G06F 7/503* (2006.01)
  *G06F 7/509* (2006.01)
  *G06F 7/544* (2006.01)

(52) U.S. Cl.
  CPC ... *G06F 7/5443* (2013.01); *H04B 2201/70715* (2013.01)

(58) Field of Classification Search
  USPC .......................................................... 708/700
  See application file for complete search history.

(56) References Cited

U.S. PATENT DOCUMENTS 5,164,914 A * 11/1992 Anderson ............... G06F 7/505
                                                      708/525
6,199,090 B1    3/2001 Mansingh et al.

FOREIGN PATENT DOCUMENTS

WO    01/05040 A1    1/2001
WO    2007/068661 A1    6/2007

* cited by examiner

ACCUMULATING DATA VALUES

FIELD OF THE DISCLOSURE

The present disclosure relates to an accumulation apparatus for accumulating a number of data values, a correlator comprising the accumulation apparatus, a wireless communication apparatus comprising the correlator, and a method of accumulating a number of data values.

BACKGROUND TO THE DISCLOSURE

In modern satellite navigation systems, such as the Global Positioning System (GPS), satellites transmit a code division multiple access (CDMA) signal in which the spectrum of a data signal has been spread prior to transmission by multiplying the data signal by a code, specifically a pseudo-random code. A receiver for such systems employs a correlator to correlate a received signal with the code in order to recover the data signal. The correlation entails forming the product of the received signal with the code, and summing the product over an integration period.

As different satellites use different codes, and as the phase of each code is not known at the receiver, many correlators, typically several hundred, are run in parallel.

FIG. 1 illustrates a typical correlator 100 comprising a multiplication stage 150 and an accumulation stage 160. The multiplication stage 150 comprises a multiplier 110 having a first input 112 for a correlator input signal and a second input 114 for a pseudo-random code generated by a code generator 120. The multiplier 110 multiplies the correlator input signal by the pseudo-random code. The accumulation stage 160 comprises a summing stage 130 and a register 140. An output 116 of the multiplier 110 is coupled to a first input 132 of the summing stage 130. A second input 134 of the summing stage 130 is supplied with the result of previous summations. An output 136 of the summing stage 130 is coupled to the register 140 which stores the result of summing by the summing stage 130. An output 146 of the register 140 is coupled to the second input 134 of the summing stage 130 for delivering the result of previous summations.

Typically, the accumulation stage 160 comprises synchronous registers. Such a solution can require a large chip area when implemented in an integrated circuit, due to the requirement for a balanced clock tree and a dedicated scan structure, meaning that many clock buffers are needed for distributing a clock signal in a balanced way, and also such a solution can have a high power consumption. Moreover, the accumulation stage 160 potentially has a high electromagnetic emission due to the large amount of digital logic clocked simultaneously.

SUMMARY OF THE DISCLOSURE

According to a first aspect, there is provided an accumulation apparatus for accumulating a number of data values, the accumulation apparatus comprising: an adder arranged, for each of the number of data values in turn, to add the data value to an adder sum present at an output of the adder for the preceding one of the data values; an asynchronous ripple counter coupled to the adder to generate a ripple count by counting occurrences of overflow of the adder, wherein the accumulation apparatus provides an accumulated data value having the adder sum as its least significant part and the ripple count as its most significant part.

According to a second aspect, there is provided a method of accumulating a number of data values, comprising: for each of the number of data values in turn, adding, in an adder, the data value to an adder sum present at an output of the adder for the preceding one of the data values; generating a ripple count by counting in an asynchronous ripple counter occurrences of overflow of the adder; and providing an accumulated data value having the adder sum as its least significant part and the ripple count as its most significant part.

Thus the accumulation apparatus may have an adder for accumulating the least significant bits of the accumulated data value, and an asynchronous ripple counter for accumulating the most significant bits by incrementing each time the adder overflows. Therefore, an adder capable of accommodating all the bits of the accumulated data value is not required. As an asynchronous ripple counter can have a lower complexity and lower power consumption than an adder, the overall power consumption and complexity, relative to a single adder, is reduced. Consequently, the chip area of an integrated circuit incorporating the accumulation apparatus can be reduced. Individual flip-flops of an asynchronous ripple counter toggle only when there is a bit transition in the accumulated value in the asynchronous ripple counter, thereby contributing to low power consumption. Furthermore, the most significant bits of the accumulated data value generally change less frequently than the least significant bits, and so a relatively slow speed of operation of the asynchronous ripple counter, compared with an adder, can be sufficient. A further consequence of the reduced complexity resulting from using the asynchronous ripple counter is reduced electromagnetic emission as noise, due to reduced clocking of digital logic circuits simultaneously.

In one preferred embodiment the adder may be a synchronous adder. This enables faster operation of the accumulation apparatus, as the least significant bits of the accumulated data value, which are provided by the adder sum of the adder, generally change more frequently than the most significant bits of the accumulated data value, which are provided by the ripple count of the asynchronous ripple counter. However, in other embodiments the adder may be an asynchronous adder, which can enable reduced chip area and reduced electromagnetic emission, compared with a synchronous adder.

Preferably the ripple count may comprise more bits than the adder sum. This enables improved power conservation and reduced integrated circuit chip area. In one embodiment, the ripple count may comprise at least twice as many bits as the adder sum. For example, the ripple count may comprise 12 bits and the adder sum may comprise 4 bits. In another example, the ripple count may comprise 11 bits and the adder sum may comprise 5 bits. The adder sum comprises at least as many bits as the number of bits used to represent each of the data values. For example, with 4-bit data values, a 4-bit adder sum or a 5-bit adder sum may be used. In the latter case, one adder stage of the adder may be arranged to prevent glitches generated at the output of the adder, that is, undesired transitions in the most significant bits of the adder sum, from being counted by the asynchronous ripple counter.

The accumulation apparatus may comprise a biasing stage arranged to generate the data values by adding a bias value to input signal samples. Likewise, the method of accumulating may comprise generating the data values by adding a bias value to input signal samples. Furthermore, the accumulation apparatus may comprise a bias removal stage arranged for generating an accumulation apparatus output value by subtracting from the accumulated data value an accumulated bias equal to the bias value multiplied by the number of data values. Likewise, the method of accumulating may comprise generating an accumulation output value by subtracting from the accumulated data value an accumulated bias equal to the bias value multiplied by the number of data values. These features enable data values of different signs to be accumulated by the accumulation apparatus. In other embodiments, the addition of the bias value and/or subtraction of the accumulated bias may be external to the accumulation apparatus or external to the method of accumulating.

According to a third aspect, there is provided a correlator comprising the accumulation apparatus coupled to an output of a product stage, wherein the product stage is arranged for generating a product signal by forming the product of a correlator input signal and a pseudo-random code. This enables the correlator to have improved power conservation and reduced integrated circuit chip area by employing the accumulation apparatus.

According to a fourth aspect, there is provided a method of correlation comprising the method of accumulating a number of data values following generating a product signal by forming the product of a correlator input signal and a pseudo-random code. This enables correlation with improved power conservation and reduced integrated circuit chip area.

In one embodiment of the correlator or method of correlation, the data values may be the product signal samples of the product signal. This feature enables low complexity, and may be used, for example, when the product signal samples all have the same sign, such as when the product signal samples all have a positive value.

In another embodiment of the correlator, the accumulation apparatus may be coupled to the output of the product stage by means of a biasing stage arranged to generate the data values by adding a bias value to the product signal samples of the product signal. Likewise, the method of correlation may comprise generating the data values by adding a bias value to the product signal samples of the product signal. This feature enables low complexity, and may be used, for example, when the product signal samples comprise positive and negative values.

The correlator may comprise a bias removal stage arranged for generating a correlator output value by subtracting from the accumulated data value an accumulated bias equal to the bias value multiplied by the number of data values. Likewise, the method of correlation may comprise generating a correlator output value by subtracting from the accumulated data value an accumulated bias equal to the bias value multiplied by the number of data values. This enables the removal of the bias value in embodiments that add a bias value.

The product stage may comprise: an input stage for providing correlator input signal samples of the correlator input signal and the negative of the correlator input signal samples; a code generator for generating a pseudo-random code comprising symbols having first and second values; and a multiplexer coupled to the code generator for generating the product signal samples by selecting one of the correlator input signal samples for each symbol of the pseudo-random code having the first value and selecting one of the negative of the correlator input signal samples for each symbol of the pseudo-random code having the second value. Likewise, the method of correlation may comprise: providing correlator input signal samples of the correlator input signal and the negative of the correlator input signal samples; generating a pseudo-random code comprising symbols having first and second values; and generating product signal samples of the product signal by selecting one of the correlator input signal samples for each symbol of the pseudo-random code having the first value and selecting one of the negative of the correlator input signal samples for each symbol of the pseudo-random code having the second value. This enables improved power conservation and reduced integrated circuit chip area.

In a further embodiment of the correlator, the accumulation apparatus may be coupled to an output of a product and bias stage comprising: an input stage for providing correlator input signal samples of the correlator input signal and the negative of the correlator input signal samples; a bias stage for adding a bias value to the correlator input signal samples and the negative of the correlator input signal samples to generate, respectively, biased correlator input signal samples and biased negative of the correlator input signal samples; a code generator for generating a pseudo-random code comprising symbols having first and second values; and a multiplexer for generating the data values by selecting one of the biased correlator input signal samples in response to each symbol of the pseudo-random code having the first value and selecting one of the biased negative of the correlator input signal samples in response to each symbol of the pseudo-random code having the second value. Likewise, the method of correlation may comprise, prior to the accumulating of a number of data values: providing correlator input signal samples of the correlator input signal and the negative of the correlator input signal samples; generating biased correlator input signal samples and biased negative of the correlator input signal samples by adding a bias value to, respectively, the correlator input signal samples and the negative of the correlator input signal samples; generating a pseudo-random code comprising symbols having first and second values; and generating the data values by selecting one of the biased correlator input signal samples in response to each symbol of the pseudo-random code having the first value and selecting one of the biased negative of the correlator input signal samples in response to each symbol of the pseudo-random code having the second value. This enables improved power conservation and reduced complexity in devices requiring a correlator input signal to be processed by a plurality of correlators or a plurality of correlations, by enabling the input stage and bias stage to be shared by a plurality of correlators or plurality of correlations.

In such a further embodiment, the correlator may comprise a bias removal stage coupled to an output of the accumulation apparatus and arranged for generating a correlator output value by subtracting from the accumulated data value an accumulated bias equal to the bias value multiplied by the number of data values. Likewise, the method of correlation may comprise generating a correlator output value by subtracting from the accumulated data value an accumulated bias equal to the bias value multiplied by the number of data values. This enables the removal of the bias value in embodiments that add a bias value.

The bias value may be a power of two. This enables the accumulated bias to be determined with a low complexity implementation.

According to a fifth aspect, there is provided a wireless communication device comprising the correlator.

According to a sixth aspect, there is provided a wireless communication device comprising a plurality of correlators in which the input stage and the bias stage are common to each of the plurality of correlators.

BRIEF DESCRIPTION OF THE DRAWINGS

Preferred embodiments will now be described, by way of example only, with reference to the accompanying drawings, in which.

DETAILED DESCRIPTION OF PREFERRED EMBODIMENTS

Figure 1:
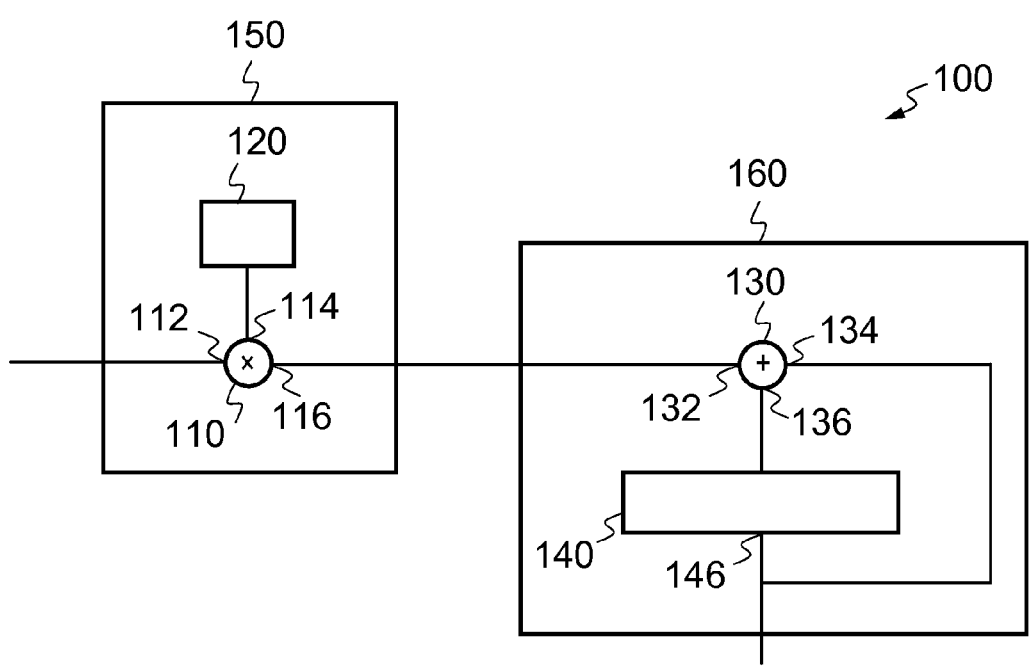
FIG. 1 is a prior art correlator.
Figure 2:
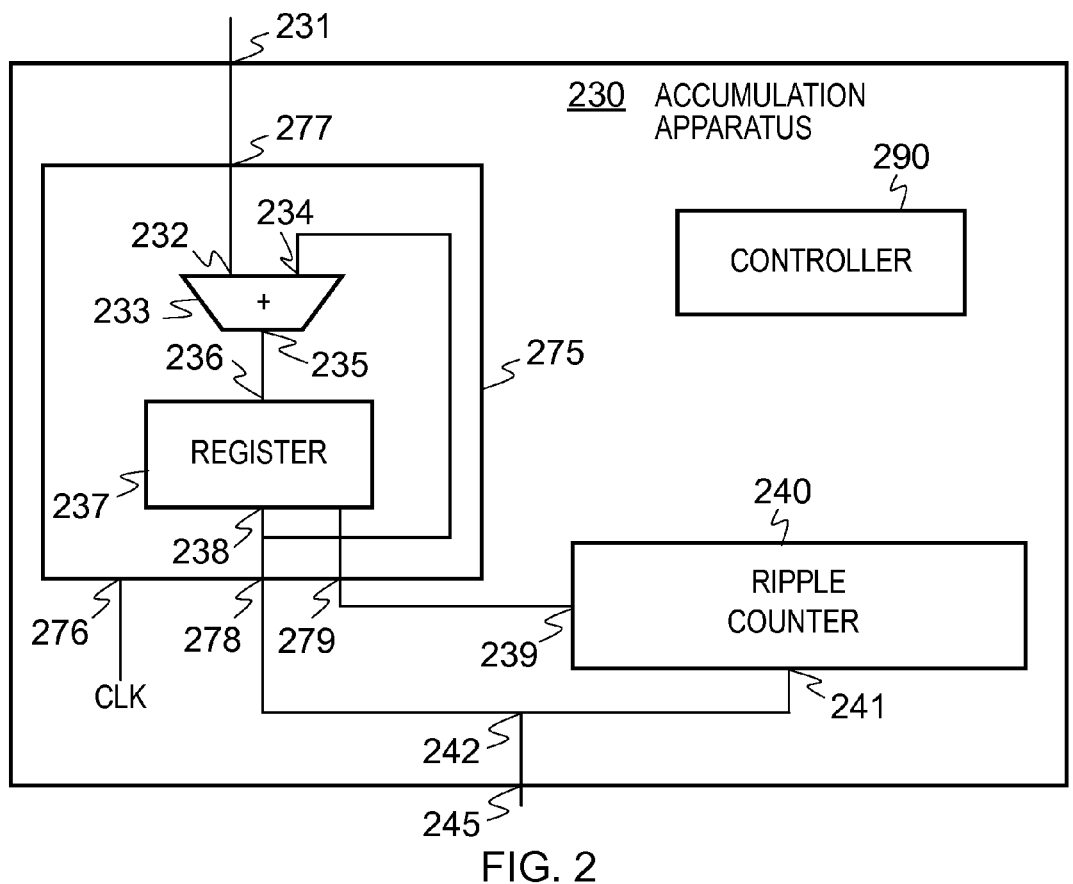
FIG. 2 is a block schematic diagram of an accumulation apparatus for accumulating a number of data values according to a first preferred embodiment.

Referring to FIG. 2, an accumulation apparatus 230 according to a first preferred embodiment comprises an accumulation apparatus input 231 for receiving a sequence of data values which may be, for example, samples of a received spread spectrum signal in a wireless receiver after multiplication by a despreading code. The accumulation apparatus input 231 is coupled to a first input 277 of an adder 275. The first input 277 of the adder 275 is coupled to a first input 232 of a summing stage 233. A sum of data values which have been summed previously is provided at a second input 234 of the summing stage 233. The summing stage 233 adds each of the sequence of data values presented at the first input 232 of the summing stage 233 to the sum of data values present at the second input 234 of the summing stage 233 and the resulting sum is delivered at an output 235 of the summing stage 233 to an input 236 of a register 237 where it is stored temporarily when the register 237 is clocked by a system clock signal CLK which is applied to a clock input 276 of the adder 275. The adder 275 is therefore, in this embodiment, a synchronous adder, as the bit values of the resulting sum generated by the summing stage 233 are sampled synchronously, in particular simultaneously, into the register 237. Therefore, addition in the adder 275 is fast, and each bit of the register 237 storing the result of the addition may change during a single cycle of the system clock signal CLK, dependent on the value of the two numbers being added together. In alternative embodiments, the adder 275 may be an asynchronous adder, in which case the clock input 276 of the adder 275 may be omitted.

The resulting sum stored in the register 237 is referred to in this description as the adder sum. A first output 238 of the register 237 is coupled to the second input 234 of the summing stage 233. In this way, the adder sum for each of the data values is the result of the addition for that data value by the adder 275. In other words, the adder sum is the sum of the data values which have been summed previously, that is, a running sum of the data values, excluding any overflow of the adder 275. Overflow occurs when the adder 275 exceeds its maximum count value, or in other words, when the result of addition by the adder 275 exceeds the maximum value that the adder sum can represent, in which case the adder sum wraps around, that is, reverts to a lower value. In this way, the adder sum is truncated to a maximum number of least significant bits. Therefore, if the adder 275 has a word length of N bits, where N is an integer, its maximum count value is $2^N-1$, and the value of the adder sum is modulo $2^N$. The first output 238 of the register 237 is coupled to a first output 278 of the adder 275. The accumulation apparatus 230 also comprises a controller 290 for initialising the adder 275, in particular the summing stage 233 and the register 237, and the asynchronous ripple counter 240 to zero prior to commencing accumulation of the data values.

A second output of the register 237 is coupled, by means of a second output 279 of the adder 275, to an input 239 of an asynchronous ripple counter 240, and provides an indication of overflow of the adder 275, which may be an indication of overflow of the summing stage 233 or an indication of overflow of the register 237. The asynchronous ripple counter 240 is a multi-bit counter that can increment by one bit value in response to a rising signal transition, or alternatively a falling signal transition, at its input 239, without requiring a clock signal for its operation. When the adder 237 overflows, there is a signal transition at the input 239 of the asynchronous ripple counter 240, for example from a binary one to a binary zero, or from a binary zero to a binary one. The asynchronous ripple counter 240 counts these signal transitions which occur when the adder 275 overflows. The resulting count value of the ripple counter 240 is referred to in this description as the ripple count, and is delivered at an output 241 of the ripple counter 240.

The sum of the data values presented at the accumulation apparatus input 231 is delivered as an accumulated data value at an output 245 of the accumulation apparatus 230. The accumulated data value has two portions: a least significant portion which is the adder sum delivered at the first output 278 of the adder 275 coupled to the output 245 of the accumulation apparatus 230, and a most significant portion which is the ripple sum delivered at the output 241 of the asynchronous ripple counter 240 coupled to the output 245 of the accumulation apparatus 230. The first output 278 of the adder 275 and the output 241 of the asynchronous ripple counter 240 are both coupled to the output 245 of the accumulation apparatus 230 by means of a combining node 242 where the most significant portion and the least significant portion of the accumulated data value are combined into to a single word. The most significant portion and the least significant portion of the accumulated data value are combined side by side, as they have no common bit values.

In general, the accumulated data value comprises N+M bits, with the least significant portion of the accumulated data value comprising N bits and the most significant portion of the accumulated data value comprising M bits. The least significant portion of the accumulated data value comprising the N bits indicates the value of powers of two $2^0, 2^1 \ldots 2^{N-1}$. The most significant portion of the accumulated data value comprising the M bits indicates the value of powers of two $2^N, 2^{N+1} \ldots 2^{N+M-1}$. In this case the accumulation apparatus 230 is capable of accumulating values of the accumulated data value in the range 0 to $2^{N+M}-1$, with the adder 275 counting values of the adder sum in the range 0 to $2^N-1$. In other words, the adder 275 has a word size of N bits, and the asynchronous ripple counter 240 has a word size of M bits. This corresponds to the adder sum comprising N bits, that is, having a word size of N bits, and the ripple count comprising M bits, that is, having a word size of M bits. As an example, if N=4 and M=12, the accumulation apparatus 230 is capable of accumulating values of the accumulated data value in the range 0 to 65535 with the adder 275 counting values of the adder sum in the range 0 to 15. A balance must be struck when selecting the word lengths of the adder 275 and the word length of the asynchronous ripple counter 240, particularly in applications where high speed operation is required, as the asynchronous ripple counter 240 can have a smaller chip area and lower power consumption than the adder 275, but may be slower in operation. Typically, the word size of the adder 275 may exceed the word size of the data values, and the word size of the asynchronous ripple counter 240 may exceed the word size of the adder 275. For example, the word size of the asynchronous ripple counter 240 may comprise at least twice as many bits as the word size of the adder 275. As another example, the word size of the adder 275 may be equal to the word size of the asynchronous ripple counter 240, such as four bits each.

Figure 3:
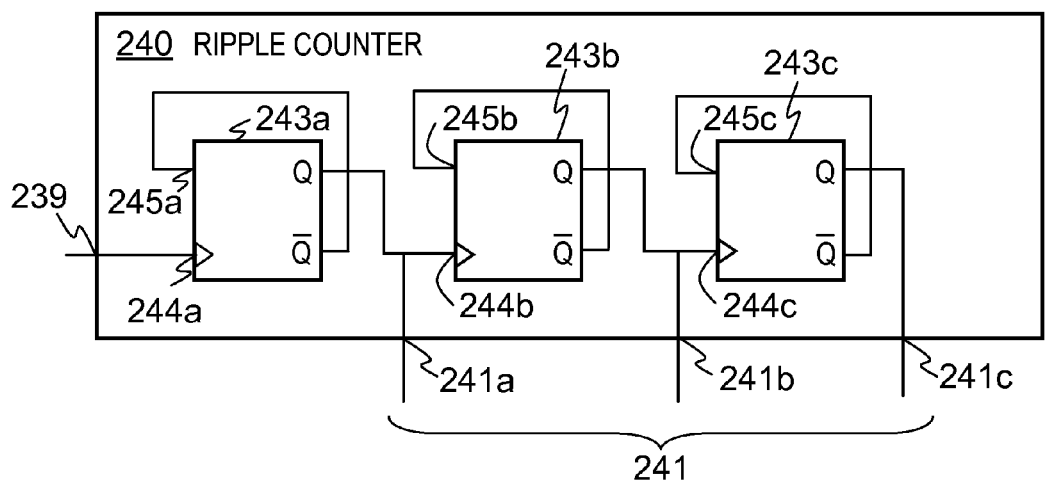
FIG. 3 is a block schematic diagram of an asynchronous ripple counter of the accumulation apparatus.

Referring to FIG. 3, an embodiment of the asynchronous ripple counter 240 is illustrated for the case of M=3, although the structure may be readily extended to other values of M. The asynchronous ripple counter 240 comprises a series of flip-flops 243a, 243b, 243c, comprising a first or initial flip flop 243a, a second or intermediate flip flop 243b and a third or final flip flop 243 c, which may be, for example, D-type flip flops. The initial flip flop 243a has a first input 244a coupled to the input 239 of the asynchronous ripple counter 240 for receiving the indication of overflow of the adder 275. A first output of the initial flip-flop 243a, indicated in FIG. 3 as a Q output, is coupled to a first input 244b of the intermediate flip-flop 243b. A second output of the initial flip-flop 243a, indicated in FIG. 3 as a $\overline{Q}$ output, which delivers an inverse of the signal delivered at the first output of the initial flip-flop 243a, that is, a binary zero when the Q output is at a binary one, and a binary one when the Q output is at a binary zero, is coupled to a second input 245a of the initial flip-flop 243a. The first output of the initial flip-flop 243a is coupled to a first sub-output 241a of the output 241 of the asynchronous ripple counter 240 for delivering the least significant bit of the ripple count.

A first output of the intermediate flip-flop 243b, indicated in FIG. 3 as a Q output, is coupled to a first input 244c of the final flip-flop 243c. A second output of the intermediate flip-flop 243b, indicated in FIG. 3 as a $\overline{Q}$ output, which delivers an inverse of the signal delivered at the first output of the intermediate flip-flop 243b, is coupled to a second input 245b of the intermediate flip-flop 243b. The first output of the intermediate flip-flop 243b is coupled to a second sub-output 241b of the output 241 of the ripple counter 240 for delivering the second-to-least significant bit of the ripple count.

A first output of the final flip-flop 243c, indicated in FIG. 3 as a Q output, is coupled to a third sub-output 241c of the output 241 of the ripple counter 240 for delivering the most significant bit of the ripple count. A second output of the final flip-flop 243c, indicated in FIG. 3 as a $\overline{Q}$ output, which delivers an inverse of the signal delivered at the first output of the final flip-flop 243c, is coupled to a second input 245c of the final flip-flop 243c.

The first input 244a of the initial flip flop 243a, the first input 244b of the intermediate flip flop 243b, and the first input 244c of the final flip flop 243c are clock inputs. Therefore, each of the series of flip flops 243a, 243b, 243c, that is, the initial flip flop 243a, the intermediate flip flop 243b and the final flip flop 243c, is clocked by a transition in a bit value present at their respective first inputs 244a, 244b, 244c. The initial flip flop 243a, the intermediate flip flop 243b and the final flip flop 243c may be, typically, rising edge flip flops, in which case they are clocked by a transition from a binary zero to a binary one. However, in other embodiments falling edge flip flops may be used, in which case they are clocked by a transition from a binary one to a binary zero.

The asynchronous ripple counter 240 illustrated in FIG. 3 may be readily extended to other values of M by including additional ones of the intermediate flip-flop 243b coupled in a corresponding manner, the total number of flip-flops 243a, 243b, 243c, including the initial flip-flop 243a and the final flip-flop 243c, being equal to the value of M.

Figure 4:
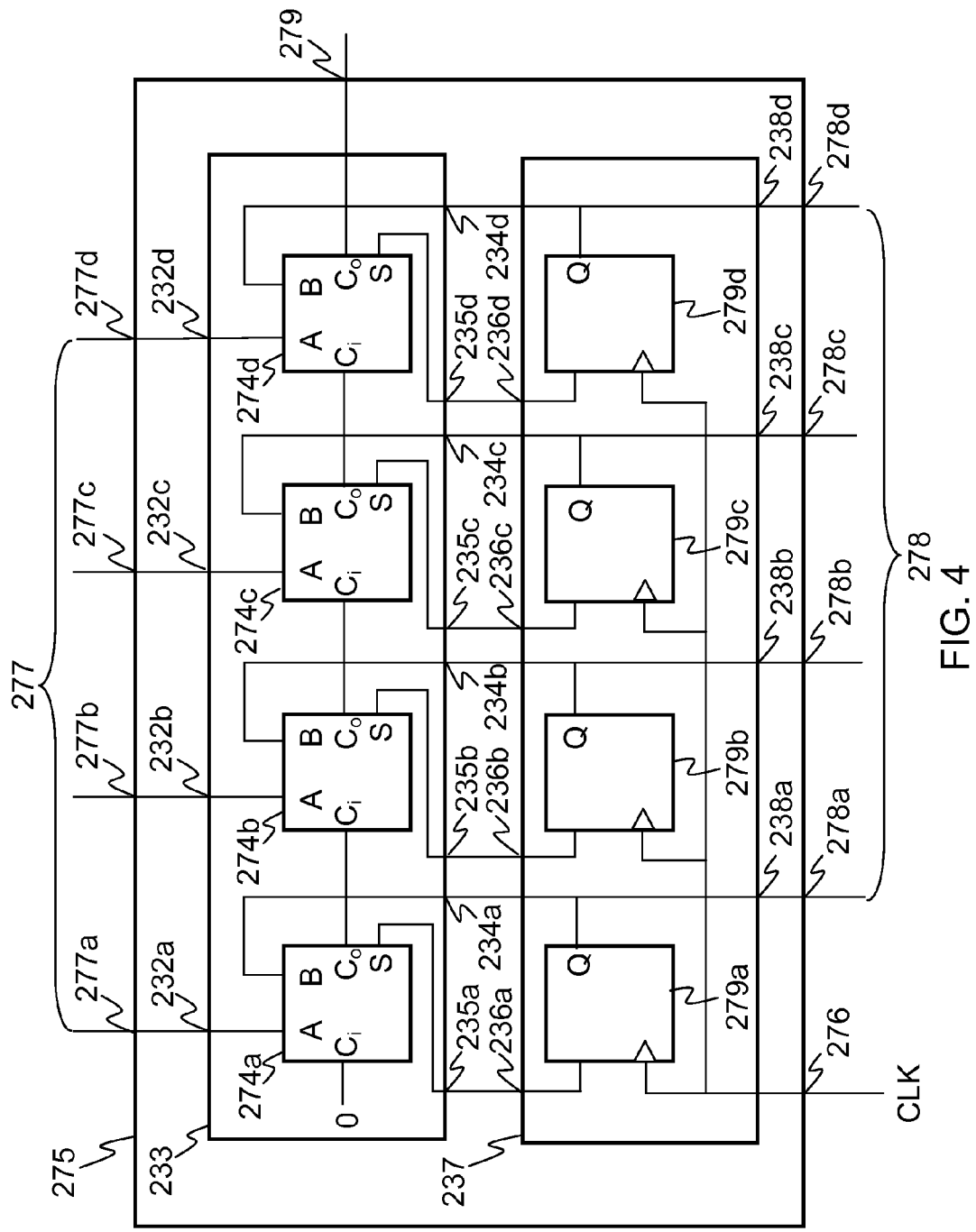
FIG. 4 is a block schematic diagram of an adder of the accumulation apparatus.

Referring to FIG. 4, an embodiment of the adder 275 is illustrated in more detail for the case of N=4, although the structure may be readily extended to other values of N. The first input 277 of the adder 275 comprises first to fourth sub-inputs 277a . . . d. The first sub-input 277a of the adder 275 receives the least significant bit of the 4-bit data values, the second sub-input 277b of the adder 275 receives the second least significant bit of the 4-bit data values, the third sub-input 277c of the adder 275 receives the third least significant bit of the 4-bit data values, and the fourth sub-input 277d of the adder 275 receives the most significant bit of the 4-bit data values. The first input 232 of the summing stage 233 comprises first to fourth sub-inputs 232a . . . d which are coupled to, respectively, the first to fourth sub-inputs 277a . . . d of the first input 277 the adder 275.

The summing stage 233 comprises a first adder stage 274a, a second adder stage 274b, a third adder stage 274c and a fourth adder stage 274d. A first input, denoted A in FIG. 4 and referred to as an A input, of each of the first to fourth adder stages 274a . . . d is coupled to, respectively, the first to fourth sub-inputs 232a . . . d of the first input 232 of the summing stage 233. Each of the first to fourth adder stages 274a . . . d also comprises a second input, denoted B in FIG. 4 and referred to as a B input, and a third input, denoted C, in FIG. 4 and referred to as a carry-in input, for receiving a carry-in signal. Each of the first to fourth adder stages 274a . . . d forms the sum of the bits present at its respective A input, B input and carry-in input, and delivers a least significant bit of the sum at a first output, denoted S in FIG. 4 and referred to as the sum output, of the respective first to fourth adder stages 274a . . . d, and delivers any carry-out bit of the sum at a second output, denoted $C_o$ and referred to as a carry-out output, of the respective first to fourth adder stages 274a . . . d. The carry-in input of the first adder stage 274a is provided with a binary zero, the carry-in input of the second adder stage 274b is coupled to the carry-out output of the first adder stage 274a, the carry-in input of the third adder stage 274c is coupled to the carry-out output of the second adder stage 274b, the carry-in input of the fourth adder stage 274d is coupled to the carry-out output of the third adder stage 274c, and the carry-out output of the fourth adder stage 274d is coupled to the second output 279 of the adder 275 for delivering an indication of overflow of the adder 275, by means of a transition from a binary zero to a binary one. The output 235 of the summing stage 233 comprises first to fourth sub-outputs 235a . . . d. The sum outputs, S, of the first to fourth adder stages 274a . . . d are coupled to, respectively, the first to fourth sub-outputs 235a ... d of the output 235 of the summing stage 233. The second input 234 of the summing stage 233 comprises first to fourth sub-inputs 234a ... d.

The input 236 of the register 237 comprises first to fourth sub-inputs 236a ... d, and the first output 238 of the register 237 comprises first to fourth sub-outputs 238a ... d which are coupled to respective first to fourth sub-outputs 278a ... d of the first output 278 of the adder 275. The register 237 comprises a first flip flop 279a, a second flip flop 279b, a third flip flop 279c and a fourth flip flop 279d. A first input of each of the first to fourth flip flops 279a ... d of the register 237 is coupled to respective ones of the sum outputs, S, of the first to fourth adder stages 274a ... d of the summing stage 233 by means of the first to fourth sub-outputs 235a ... d of the output 235 summing stage 233 and the first to fourth sub-inputs 236a ... d of the input 236 of the register 237. An output, denoted Q in FIG. 4, of each of the first to fourth flip flops 279a ... d of the register 237 is coupled to respective ones of the B inputs of the first to fourth adder stages 274a ... d of the summing stage 233 by means of the first to fourth sub-inputs 234a ... d of the second input 234 of the summing stage 233, and to respective ones of the sub-outputs 278a ... d of the first output 278 of the adder 275 by means of the sub-outputs 238a ... d of the first output 238 of the register 237 for delivering the adder sum. A clock input of each of the first to fourth flip flops 279a ... d of the register 237 is coupled to the clock input 276 of the adder 275, and therefore the register 237 is a synchronous register as its storage elements, specifically the first to fourth flip flops 279a ... d, are all controlled by the same system clock signal CLK.

Figure 5:
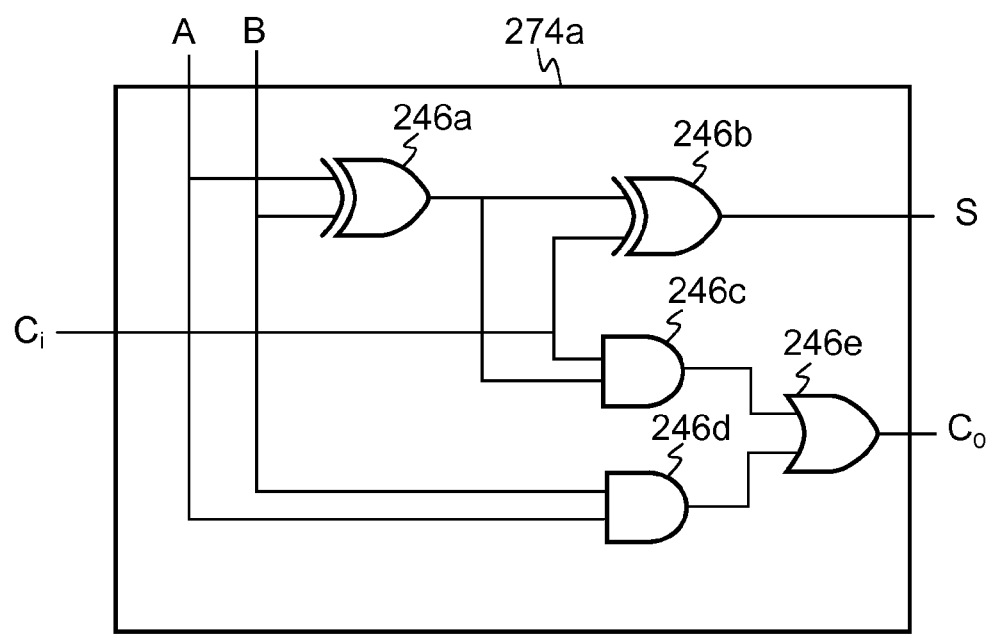
FIG. 5 is a schematic diagram of an adder stage of the adder.

Referring to FIG. 5, the first adder stage 274a has an identical architecture to the second, third and fourth adder stages 274b, 274c, 274d, and comprises a first exclusive-OR gate 246a having first and second inputs coupled to, respectively, the A input and the B input of the first adder stage 274a. A second exclusive-OR gate 246b has a first input coupled to an output of the first exclusive-OR gate 246a, a second input coupled to the carry-in input, $C_i$, of the first adder stage 274a, and an output coupled to the sum output, S, of the first adder stage 274a. A first AND gate 246c has a first input coupled to the carry-in input, $C_i$, of the first adder stage 274a, a second input coupled to the output of the first exclusive-OR gate 246a, and an output coupled to a first input of an OR gate 246e. A second AND gate 246d has first and second inputs coupled to, respectively, the A input and the B input of the first adder stage 274a, and an output coupled to a second input of the OR gate 246e. An output of the OR gate 246e is coupled to the carry-out output, $C_o$, of the first adder stage 274a.

The first adder stage 274a described with reference to FIG. 5 is capable of operating as a full adder stage. However, a full adder stage having either it's A input, B input or carry-in input set to a binary zero operates as a half adder stage. Therefore, as the carry-in input, $C_i$, of the first adder stage 274a is set to a binary zero, the first adder stage 274a operates as a half adder stage and therefore the first adder stage 274a may alternatively have an architecture of a half adder stage.

For example, the first adder stage 274a may have a simplified architecture, with only the second, third and fourth adder stages 274b, 274c, 274d having the architecture described with reference to FIG. 5. In this case, the carry-in input, $C_i$, of the first adder stage 274a may be omitted, the second exclusive-OR gate 246b may be omitted, with the output of the first exclusive-OR gate 246a being coupled directly to the sum output, S, and the first AND gate 246c and the OR gate 246e may be omitted, with the output of the second AND gate 246d being coupled directly to the carry-out output, $C_o$, of the first adder stage 274a.

Figure 6:
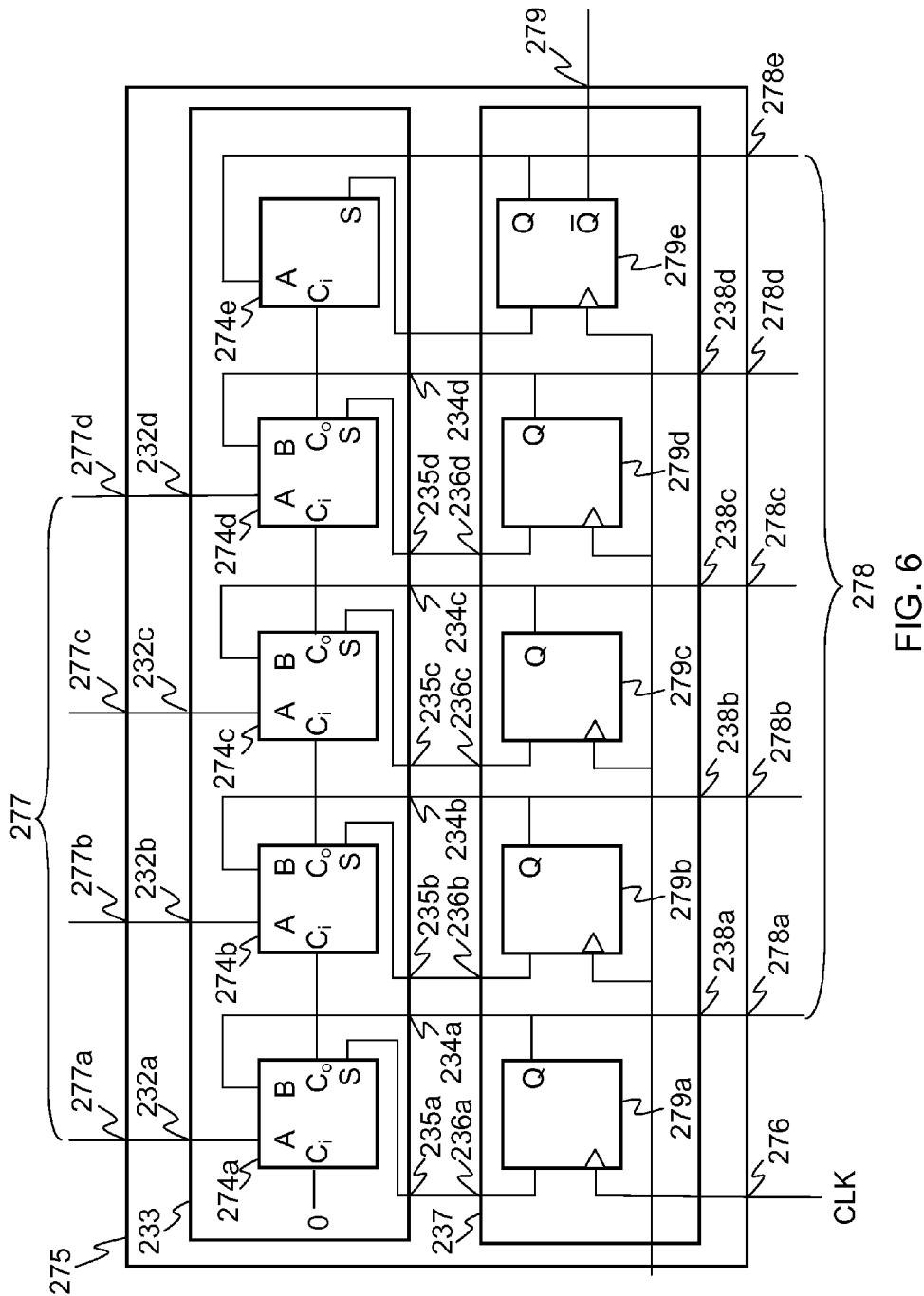
FIG. 6 is a block schematic diagram of another embodiment of an adder of the accumulation apparatus.

Referring to FIG. 6, an alternative embodiment of the adder 275, although providing a 5-bit adder sum rather than a 4-bit adder sum, comprises an architecture largely the same as the adder described with reference to FIG. 4, so only the differences will be described. A fifth adder stage 274e is provided in the summing stage 233, this being a half adder, a fifth flip flop 279e is provided in the register 237, and a fifth sub-output 278e of the first output 278 of the adder 275 is provided for delivering a fifth bit of the adder sum. The carry-out output of the fourth adder stage 274d is coupled to a carry-in input, $C_i$, of the fifth adder stage 274e, instead of to the second output 279 of the adder 275. A sum output, S, of the fifth adder stage 274e is coupled to a first input of the fifth flip-flop 279e of the register 237. A first output, denoted Q in FIG. 6, of the fifth flip-flop 279e is coupled to an A input of the fifth adder stage 274e, and is coupled to the fifth sub-output 278e of the first output 278 of the adder 275. A second output, denoted $\overline{Q}$, of the fifth flip-flop 279e delivers the inverse of the binary signal at the first output of the fifth flip-flop 279e, thereby providing an indication of overflow of the adder 275 by means of a transition from a binary zero to a binary one. The second output 279 of the adder 275 is coupled to the second output, denoted $\overline{Q}$, of the fifth flip-flop 279e, instead of to the carry-out output of the fourth adder stage 274d in the embodiment of FIG. 4, for delivering an indication of overflow of the adder 275, which is the inverse of the signal at the first output of the fifth flip flop 279e. A clock input of the fifth flip-flop 279e is coupled to the clock input 276 of the adder 275. As the fifth adder stage 274e is a half adder, and as no carry-out output of the fifth adder stage 274e is required, the fifth adder stage 274e can comprise only the second excusive OR gate 246b of the adder stage described with reference to FIG. 5, with the A input of the fifth adder stage 274e being coupled to the first input of the second excusive OR gate 246b, and the carry-in input of the fifth adder stage 274e being coupled to the second input of the second exclusive OR gate 246b. Furthermore, the simplified architecture of the first adder stage 274a described above in relation to the adder 275 of FIG. 4 with reference to FIG. 5 may be used.

The embodiment of the adder 275 described with reference to FIG. 6 may be extended to provide an adder sum having more bits in the adder sum by the inclusion of additional adder stages coupled between the fourth adder stage 274d and the fifth adder stage 274e, and corresponding additional flip-flops. Such additional adder stages and corresponding flip-flops are coupled in the corresponding manner to the second, third and fourth adder stages 274b, 274c, 274d and the second, third and fourth flip-flops 279b, 279c, 279d, although such adder stages in excess of the number of bits of the data values do not required an A input and so may be half adder stages. Such half adder stages may have the architecture of the adder stage described with reference to FIG. 5, except they may be simplified by omission of the first exclusive-OR gate 246a, having the B input coupled directly to the first input of the second exclusive-OR gate 246b, and by omission of the second AND gate 246d, having the B input coupled directly to the second input of the OR gate 246e.

Figure 7:
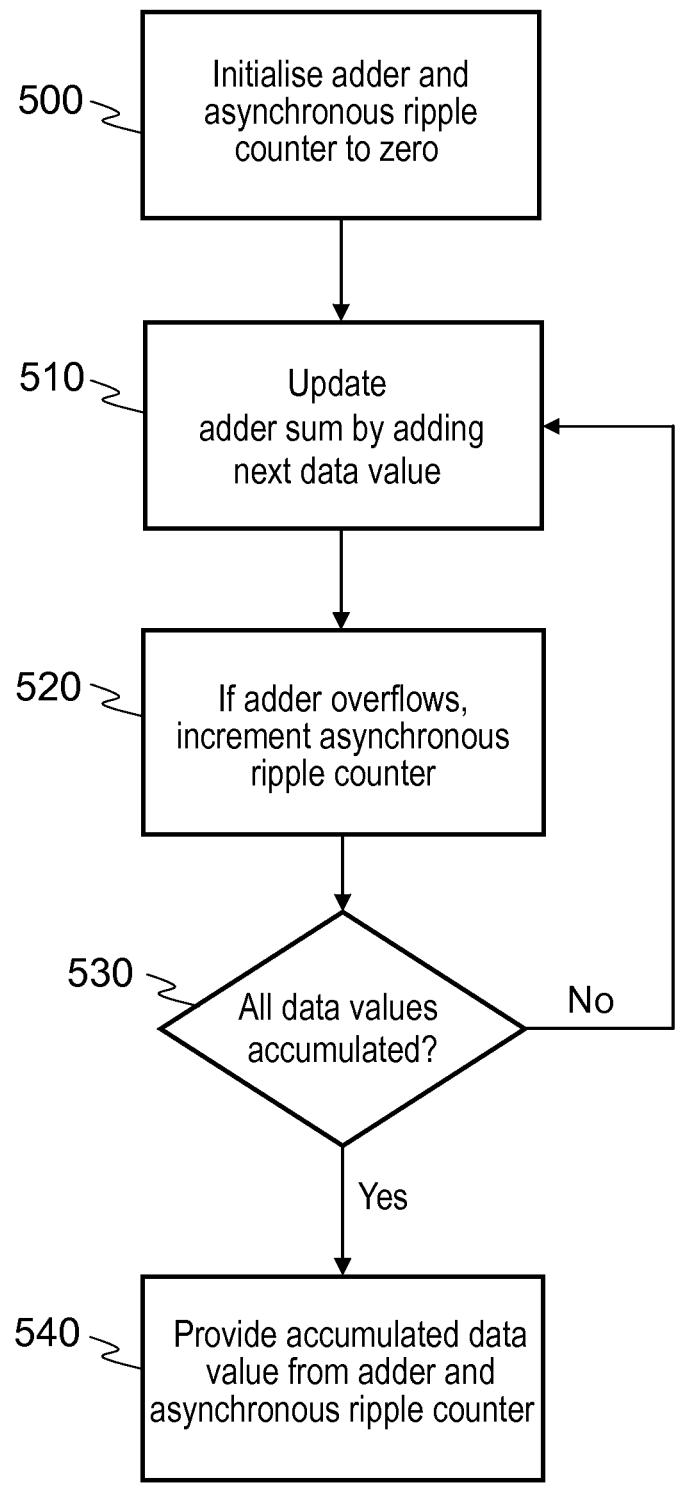
FIG. 7 is a flow chart illustrating a method of accumulating a number of data values using the accumulation apparatus.

Referring to FIG. 7, a method of accumulating a number of data values using the accumulation apparatus 230 comprises a loop in which the adder sum of the data values is formed. At step 500, the adder 275 and the asynchronous ripple counter 240 are initialised to zero, therefore the adder sum is initialised to zero. For example, the asynchronous ripple counter 240 may be initialised to zero by means of an asynchronous reset signal, and the adder 275 may be initialised to zero by synchronously or asynchronously resetting the first to fifth flip flops 279a to 279e, or by forcing the sum delivered at the output 235 of the summing stage 233 to zero. Alternatively, the initialisation of step 500 may be performed after step 540 in preparation for the next accumulation. At step 510, the initial data value, or next data value, is added to the sum of previous ones of the data values. After addition of the first data value, the adder sum is equal to the first data value. After addition of the second data value, the adder sum is equal to the sum of the first and second data values. After addition of the third data value, the adder sum is equal to the sum of the first, second and third data values, and so on until all the data values have been added. The adder sum from each of the additions is formed in the register 237. After the addition of each data value, at step 520, the asynchronous ripple counter 240 is incremented if the adder 275 overflowed as a result of the addition. At step 530, a test is made to determine whether more data values remain to be accumulated. If any data values remain to be accumulated, flow returns to step 510 where the next data value is added to the adder sum. Otherwise, the accumulation is complete and at step 540 the accumulated data value is provided, with the adder sum present in the register 237 forming a least significant portion of the accumulated data value, and the ripple count present in the asynchronous ripple counter 240 forming the most significant portion of the accumulated data value.

Figure 8:
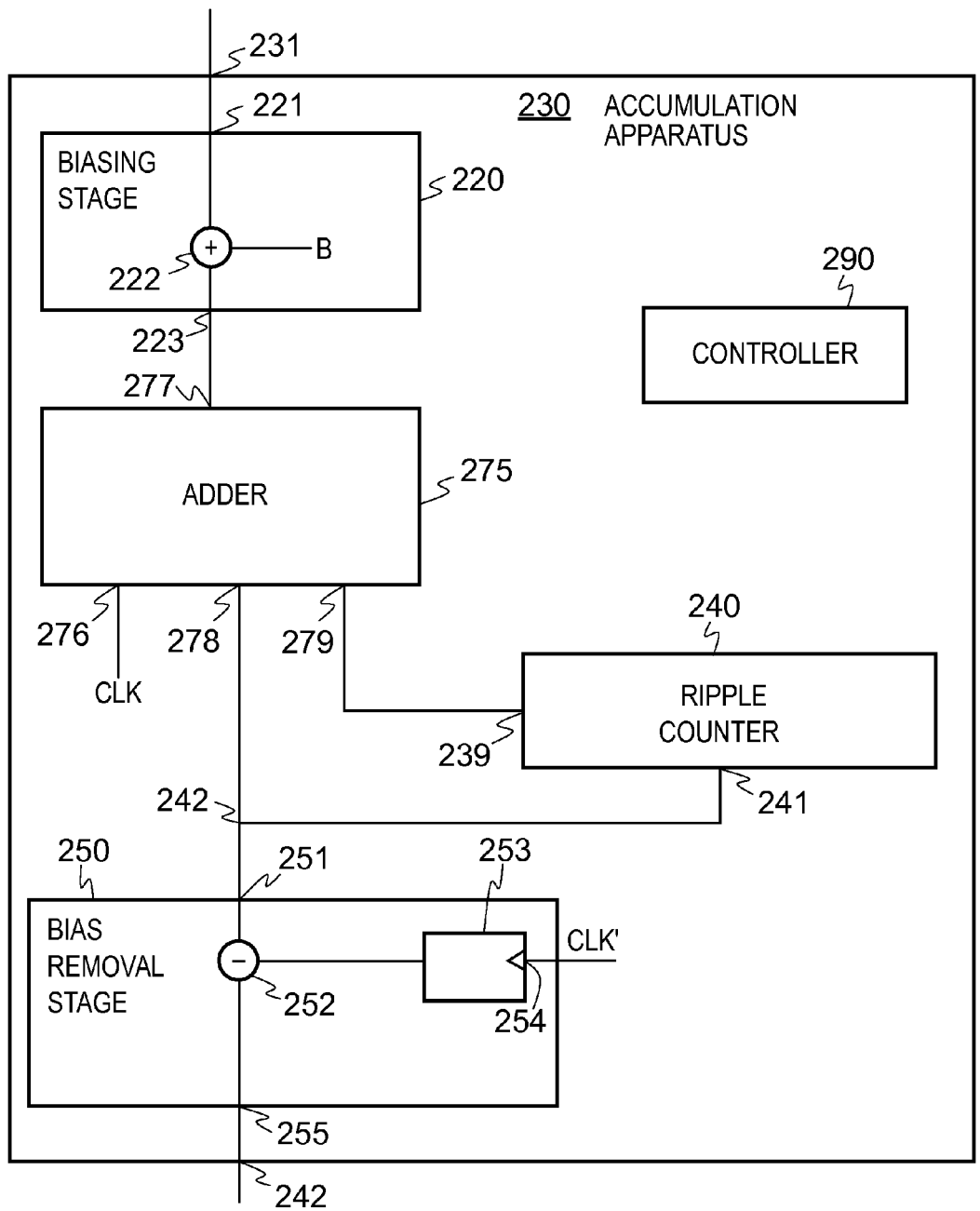
FIG. 8 is a block schematic diagram of an accumulation apparatus according to a second preferred embodiment, with biasing.

Referring to FIG. 8, an accumulation apparatus 230 according to a second preferred embodiment comprises the elements of the accumulation apparatus 230 according to the first preferred embodiment, described with reference to FIG. 2, but additionally comprises a biasing stage 220, coupled between the accumulation apparatus input 231 and the first input 277 of the adder 275, and a bias removal stage 250, coupled between the combining node 242 and the output 245 of the accumulation apparatus 230. The biasing stage 220 has an input 221 coupled to the accumulation apparatus input 231 for receiving input signal samples and, by means of an addition stage 222, adds to each of the input signal samples a constant bias value B. The biasing stage 220 has an output 223 coupled to the first input 277 of the adder 275 for delivering the data values to be accumulated by the accumulation apparatus 230, that is, the input signal samples offset by the bias value B, in other words, the biased input signals samples.

The bias value B is selected to ensure that all of the data values have the same sign, for example by ensuring that the data values are all positive. This enables the adder 275 to be an increment-only adder, rather than performing signed arithmetic, which enables a low complexity implementation. Typically, the bias value B is a power of two, which means that the calculation of the total amount of bias added to all of the input signal samples, referred to below, can be implemented simply by shifting in a shift register the total number of input signal samples, rather than, for example, using a multiplier. Also, by using a bias value B which is a power of two, the bias value B may be added to negative values of the input signal samples simply by setting the most significant bit of the input signal samples.

Continuing to refer to FIG. 8, the bias removal stage 250 receives at an input 251 the accumulated data value comprising the least significant portion delivered at the first output 278 of the adder 275 and the most significant portion delivered at the output 241 of the ripple counter 240, after combining by the combining node 242. The bias removal stage 250 comprises a bias calculation stage 253 which calculates the total amount of bias added to all of the input signal samples, in other words, the accumulated bias, by counting a number of cycles of a sample rate clock signal CLK', which may be at the same rate as the system clock CLK, at a clock input 254 of the bias calculation stage 254 during the accumulation of the data values, and multiplying the counted number of cycles by the bias value B. Where the bias value is a power of two, this multiplication may be performed simply by shifting the counted number of cycles in a shift register. The bias removal stage 250 comprises a subtraction stage 252 for subtracting the accumulated bias from the accumulated data value, delivering the result of the subtraction to an output 255 of the bias removal stage 250, which is coupled to the output 245 of the accumulation apparatus 230 for delivering an accumulation apparatus output value. The controller 290 initialises the bias calculation stage 253 to zero prior to calculation of the accumulated bias. Alternatively, instead of the bias calculation stage 253 calculating the accumulated bias, if the bias value B, and the number of data values, are constants, the accumulated bias may be stored as a constant.

Figure 9:
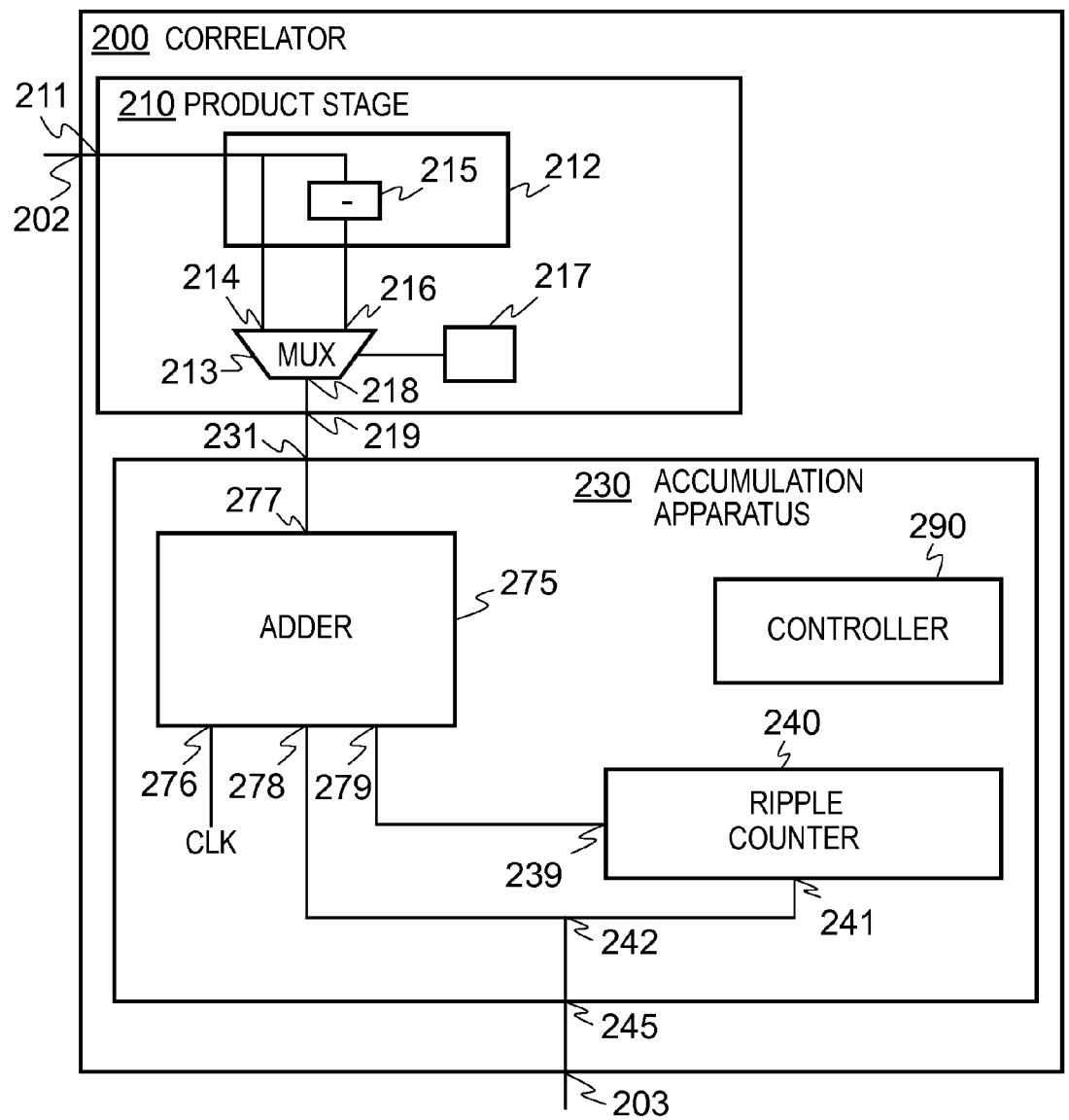
FIG. 9 is a block schematic diagram of a correlator.

Referring to FIG. 9, a correlator 200 according to the first preferred embodiment, suitable for use in, for example, a code division multiple access (CDMA) wireless receiver, comprises the accumulation apparatus 230 described with reference to FIG. 2. An input 202 of the correlator 200, for receiving a correlator input signal, is coupled to an input 211 of a product stage 210. An output 219 of the product stage 210 is coupled to the input 231 of the accumulation apparatus 230 for delivering product signal samples to the accumulation apparatus 230 as the data values to be accumulated. The output 245 of the accumulation apparatus 230 is coupled to an output 203 of the correlator 200 for delivering the accumulated data value as a correlator output value.

The product stage 210 comprises an input stage 212 coupled between the input 211 of the product stage 210 and first and second inputs 214, 216 of a multiplexer (MUX) 213. The input stage 212 provides a direct connection between the input 211 of the product stage 210 and the first input 214 of the multiplexer 213, for delivering correlator input signal samples of the correlator input signal to the multiplexer 213. It is assumed that the correlator input signal is provided in a sampled form; in applications where this is not the case, the product stage can include, for example in the input stage 212, an analogue-to-digital converter to convert the correlator input signal to a sampled form. The input stage 212 comprises an inverter 215 coupled between the input 211 of the product stage 210 and the second input 216 of the multiplexer 213, for delivering a negative of the correlator input signal samples to the multiplexer 213. The product stage 210 further comprises a code generator 217 coupled to the multiplexer 213. The code generator 217 generates a pseudo-random code comprising symbols having first and second values, that is, some of the symbols have the first value and others of the symbols have the second value. Typically, the first and second values may be +1 and −1. The multiplexer 213 couples either its first input 214 or second input 216 to an output 218 of the multiplexer 213, depending on the value of the symbols of the pseudo-random code. More specifically, for each symbol of the pseudo-random code having the first value, the multiplexer 213 couples its first input 214 to its output 218, thereby selecting a correlator input signal sample for the product signal samples at the output 219 of the product stage 210, and for each symbol of the pseudo-random code having the second value, the multiplexer 213 couples its second input 216 to its output 218, thereby selecting a negative of a correlator input signal sample for the product signal samples at the output 219 of the product stage 210.

Figure 10:
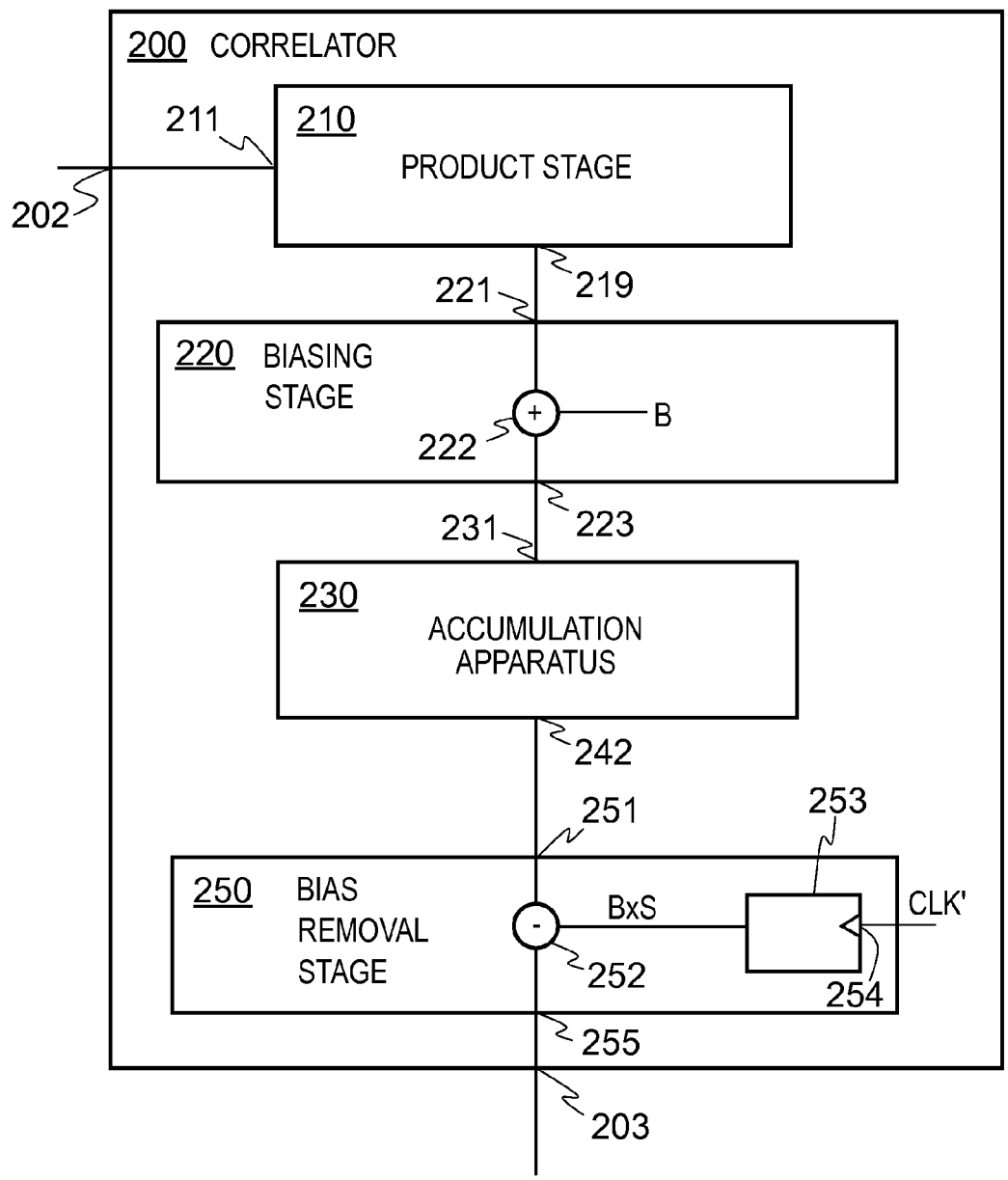
FIG. 10 is a block schematic diagram of a correlator with biasing.

Referring to FIG. 10, a correlator 200 according to the first preferred embodiment of the accumulation apparatus 230 comprises the accumulation apparatus 230 described with reference to FIG. 2, and additionally includes biasing. The input 202 of the correlator 200 is coupled to the input 211 of the product stage 210 described with reference to FIG. 9. The output 219 of the product stage 210 is coupled to an input 221 of the biasing stage 220 described with reference to FIG. 8 for delivering the product signal samples to the biasing stage 220. The output 223 of the biasing stage 220 is coupled to the input 231 of the accumulation apparatus 230 described with reference to FIG. 2 for delivering biased product signal samples as the data values. The output 245 of the accumulation apparatus 230 is coupled to the input 251 of the bias removal stage 250 described with reference to FIG. 8 for delivering the accumulated data value. The output 255 of the bias removal stage 250 is coupled to the output 203 of the correlator 200 for delivering the correlator output value.

A simple numerical example will now be described to illustrate forming the product, biasing, accumulating and bias removal for the case of correlation by the correlator 200 described with reference to FIG. 10, over four correlator input signal samples which can have values in the range −7 to +7, corresponding to accumulating, or accumulation, by the accumulation apparatus 230 over four data values. A bias value B=7 is applied by the biasing stage 220.

We consider four correlator input signal samples having values −4, −3, 2, 2. In the product stage 210, these four correlator input signal samples are delivered to the first input 214 of the multiplexer 213, and the inverter 215 delivers the inverted correlator input signal samples having values 4, 3, −2, −2 to the second input 216 of the multiplexer 213. The code generator 217 generates symbols having values −1, 1, 1, −1. Therefore, the data values received from the multiplexer 213 by the biasing stage 220 are 4, −3, 2, −2, of which the 4 and −2 are received from the second input 216 of the multiplexer 213, and the −3 and 2 are received from the first input 214 of the multiplexer 213.

The biasing stage 220 adds the bias value B=7 to each sample, and therefore the accumulation apparatus 230 receives as the data values the biased product signal samples having values 11, 4, 9, 5. In the accumulation apparatus 230, commencing with the adder sum initially at zero, the adder sum as the data values are accumulated is successively 0, 11, 15, 24, 29. The final accumulated data value 29 is passed to the bias removal stage 250 where the accumulated bias having a value 4B=28 is subtracted, there being four data values each including a bias of 7, providing the correlator output value equal to 1.

In a practical application, the correlator input signal samples and the data values may have values covering a wider numerical range than −7 to +7, and the correlation may be performed over a larger number of data values than four.

Figure 11:
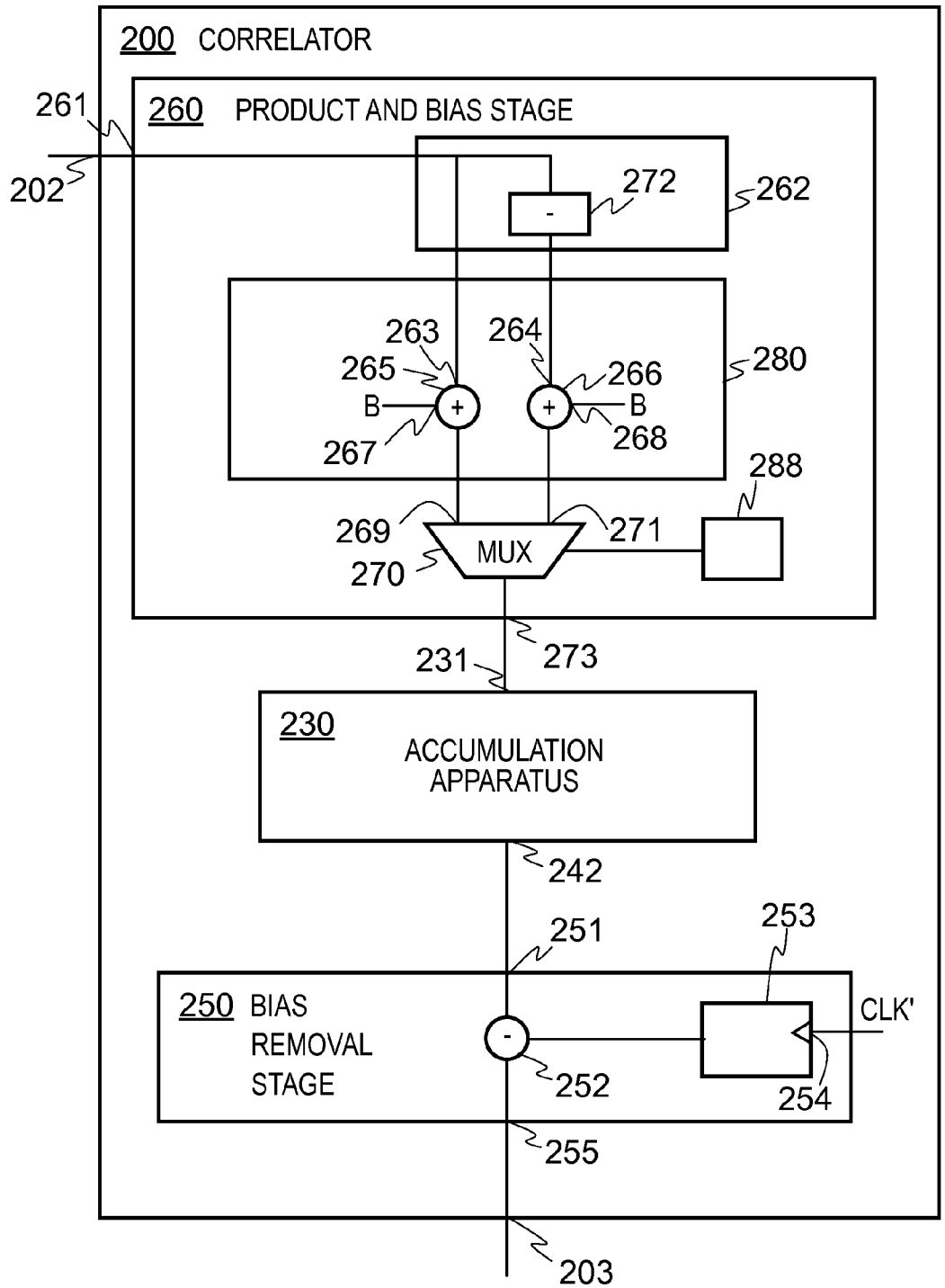
FIG. 11 is a block schematic diagram of another embodiment of a correlator with biasing.

Referring to FIG. 11, a correlator 200 according to the first preferred embodiment of the accumulation apparatus 230, comprises the accumulation apparatus 230 described with reference to FIG. 2, and also includes biasing. An input 261 of a product and bias stage 260 is coupled to the input 202 of the correlator 200 for receiving the correlator input signal.

An output 273 of the product and bias stage 260 is coupled to the input 231 of the accumulation apparatus 230 described with reference to FIG. 2 for delivering the data values. The output 245 of the accumulation apparatus 230 is coupled to the input 251 of the bias removal stage 250 described with reference to FIG. 8 for delivering the accumulated data value. The output 255 of the bias removal stage 250 is coupled to the output 203 of the correlator 200 for delivering the correlator output value.

The product and bias stage 260 comprises an input stage 262 coupled between the input 261 of the product and bias stage 260 and first inputs 263, 264 of first and second summing stages 265, 266. The bias value B is applied to second inputs 267, 268 of the first and second summing stages 265, 266. The first and second summing stages 265, 266 together constitute a bias stage 280. An output of the first summing stage 265 is coupled to a first input 269 of a multiplexer (MUX) 270, and an output of the second summing stage 266 is coupled to a second input 271 of the multiplexer 270.

The input stage 262 provides a direct connection between the input 261 of the product and bias stage 260 and the first input 269 of the multiplexer 270, for delivering correlator input signal samples of the correlator input signal to the first input 265 of the first summing stage 267. It is assumed that the correlator input signal is provided in a sampled form; in applications where this is not the case, the product and bias stage 260 stage can include, for example in the input stage 262, an analogue-to-digital converter to convert the correlator input signal to a sampled form. The input stage 262 comprises an inverter 272 coupled between the input 261 of the product and bias stage 260 and the first input 264 of the second summing stage 268, for delivering a negative of the correlator input signal samples of the correlator input signal to first input 264 of the second summing stage 268. Therefore, if a correlator input signal sample has a value S, the negative of the correlator input signal sample has a value −S. The negative of the correlator input signal samples may also be referred to as the inverse of the correlator input signal samples, or inverted correlator input signal samples. In general, if the correlator input signal samples have values in the range −P to +P, where P is a positive integer, the negative, or inverse, of the correlator input signal samples have corresponding values in the range +P to −P.

The output of the first summing stage 267 delivers to the first input 269 of the multiplexer 270 the correlator input signal samples offset by the bias value B, which are referred to as biased correlator input signal samples. The output of the second summing stage 268 delivers to the second input 271 of the multiplexer 270 the negative of the correlator input signal samples offset by the bias value B, which are referred to as biased inverted correlator input signal samples. The bias value B is selected to ensure that the first and second inputs 269, 271 of the multiplexer 270 receive only non-negative values. Therefore, for the general case of the correlator input signal samples having values in the range −P to +P, where P is a positive integer, the bias value B is normally selected to be equal to −P or −P+1, although greater values may be used. For example, if the correlator input signal samples have values in the range −7 to +7, the bias value may be 7, ensuring that the multiplexer 270 receives values in the range 0 to 14, or the bias value may be 8, ensuring that the multiplexer 270 receives values in the range 1 to 15.

The product and bias stage 260 further comprises a code generator 288 coupled to the multiplexer 270. The code generator 288 generates a pseudo-random code comprising symbols having first and second values, that is, some of the symbols have the first value and others of the symbols have the second value. Typically, the first and second values are +1 and −1. The multiplexer 270 selectively couples either its first input 269 or its second input 271, depending on the value of the symbols of the pseudo-random code, to an output of the multiplexer 270 which is coupled to the output 273 of the product and bias stage 260. More specifically, for each symbol of the pseudo-random code having the first value, the multiplexer 270 couples its first input 269 to the output 273 of the product and bias stage 26, thereby delivering a biased correlator input signal sample to the accumulation apparatus 230, and for each symbol of the pseudo-random code having the second value, the multiplexer 270 couples its second input 271 to the output 273 of the product and bias stage 26, thereby delivering to the accumulation apparatus 230 a biased inverted correlator input signal sample, which nevertheless has a non-negative value. The biased correlator input signal samples and the biased inverted correlator input signal samples together form the data values to be accumulated by the accumulation apparatus 230.

A simple numerical example will now be described to illustrate forming the product, biasing, accumulating and bias removal for the case of correlation by the correlator 200 described with reference to FIG. 11, over four correlator input signal samples which can have values in the range −7 to +7, corresponding to accumulating, or accumulation, by the accumulation apparatus 230 over four data values. A bias value B=7 is applied by the product and bias stage 260.

We consider four correlator input signal samples having values −4, −3, 2, 2. The first summing stage 265 of the product and bias stage 260 adds the bias value B to each correlator input signal sample, and therefore the first input 269 of the multiplexer 270 receives the biased correlator input signal samples having values 3, 4, 9, 9. The inverter 272 delivers the inverted correlator input signal samples having values 4, 3, −2, −2 to the second summing stage 266, to which the second summing stage 266 adds the bias value B, and therefore the second input 271 of the multiplexer 270 receives the biased inverted correlator input signal samples having values 11, 10, 5, 5. The code generator 288 generates a pseudo-random code having symbols with values −1, 1, 1, −1. Therefore, the data values received by the accumulation apparatus 230 are 11, 4, 9, 5, of which the 11 and 5 are received from the second input 271 of the multiplexer 270, and the 4 and 9 are received from the first input 269 of the multiplexer 270. After accumulation by the accumulation apparatus 230, the accumulated data value equal to 29 is delivered to the bias removal stage 250. The bias removal stage 250 subtracts 4B=28, there being four data values each including a bias of 7, and delivers the correlator output value equal to 1.

In a practical application, the correlator input signal samples and the data values may have values covering a wider numerical range than −7 to +7, and the correlation may be performed over a larger number of data values than four.

Figure 12:
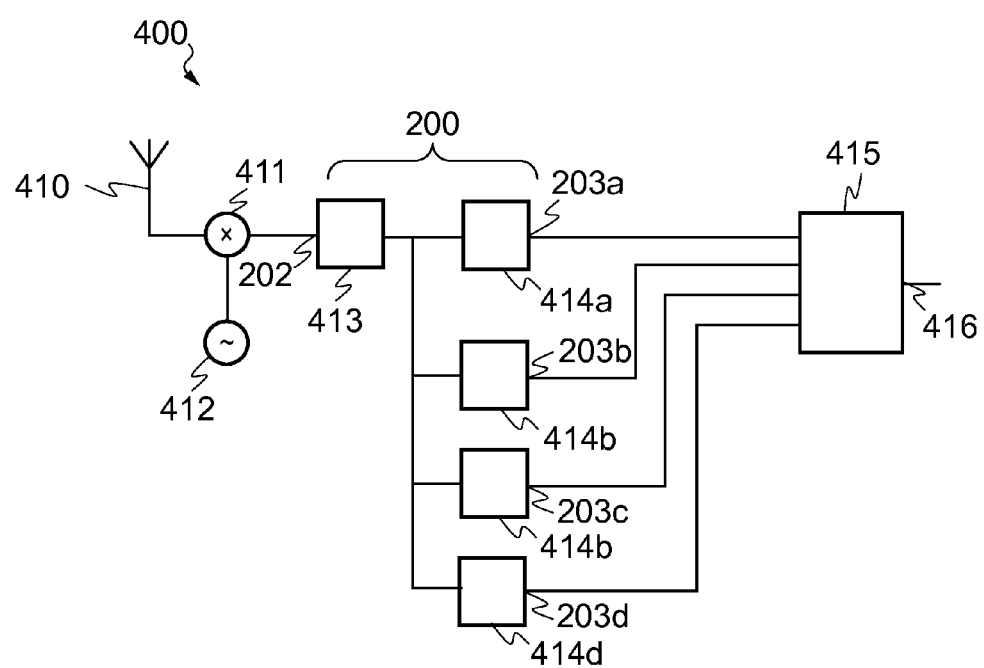
FIG. 12 is a block schematic diagram of a wireless communication device comprising a correlator.

Referring to FIG. 12, a wireless communication device 400, for example for receiving a CDMA spread spectrum signal in a satellite navigation system, comprises an antenna 410 for receiving a correlator input signal. The antenna 410 is coupled to a first input of a mixer 411 for down-converting the correlator input signal to baseband. A local oscillator 412 is coupled to a second input of the mixer 411 for tuning the wireless communication device 400 to receive the correlator input signal. An output of the mixer 411 is coupled, by means of a shared part 413, to a plurality of processing stages 414a, 414b, 414c, 414d. The shared part 413 and each of the processing stages 414a, 414b, 414c, 414d together are a correlator 200 according to the embodiment described with reference to FIG. 11. Therefore, the wireless communication device 400 comprises a plurality of correlators 200 each, with the shared part 413 being common to each of the plurality of correlators 200. The shared part 413 comprises the input stage 262 and the bias stage 280 of the product and bias stage 260 described with reference to FIG. 11. By sharing these elements between each of the plurality of correlators 200, complexity, integrated circuit area and power consumption can be reduced. Each of the processing stages 414a, 414b, 414c, 414d comprises the multiplexer 270 and code generator 268 of the product and bias stage 260 and the accumulation apparatus 230, as described with reference to FIG. 11. The code generator 288 of each of the processing stages 414a, 414b, 414c, 414d generates a different phase of the pseudo-random code or a different pseudo-random code. The output 203 of each correlator 200, referenced in FIG. 12 respectively as 203a, 203b, 203c and 203d for respective outputs of each of the plurality of processing stages 414a, 414b, 414c, 414d, is coupled to a selection stage 415 which comprises the bias removal stage 250. In addition to subtracting the accumulated bias from the accumulated data value, the selection stage 415 determines which of the processing stages 414a, 414b, 414c, 414d provides the highest correlation with the received correlator input signal, and provides at an output 416 of the selection stage 415 the correlation value from one or more of the processing stages 414a, 414b, 414c, 414d to be used by the next processing stages.

Alternatively, or additionally, the code generator 288 of each of the processing stages 414a, 414b, 414c, 414d may generate a different pseudo-random code, for example, for receiving correlator input signals from different transmitters employing the different pseudo-random codes to encode their signals. In this case, the selection stage 415 may select the correlation value from more than one of the processing stages 414a, 415b, 414c, 414d.

The bias removal performed by the selection stage 415 may take account of different numbers of the data values used by the processing stages 414a, 415b, 414c, 414d employing different pseudo-random codes, corresponding to different correlation, or integration, periods.

Alternatively, the bias removal stage 250 may be omitted from the selection stage 415 and instead be provided in each of the processing stages 414a, 415b, 414c, 414d.

Alternatively, the shared part 413 may be omitted, with the output of the mixer 411 being coupled to each of the processing stages 414a, 414b, 414c, 414d, and in this case each of the processing stage 414a, 414b, 414c, 414d may comprise a correlator 200 according to the embodiments described with reference to FIG. 7 or 8.

Further non-illustrated processing of the correlation value may take place in the wireless communication accumulation apparatus 400, for example to extract information conveyed by the received correlator input signal. The wireless communication device 400 may include additional circuitry, such as a transmitter for transmitting CDMA spread spectrum signals.

Although embodiments of the correlator 200 have been described which include the code generator 217, 288, in other embodiments the generation of the pseudo-random code may be external to the correlator 200.

Although embodiments of the correlator 200 have been described which employ the input stage 212 and the multiplexer 213 in the product stage 210, in other embodiments forming the product may be performed by using a multiplication stage, or mixer, for multiplying the correlator input signal by the pseudo-random code.

Embodiments of the accumulation apparatus 230 and correlator 200 have been described which are suitable for processing data values which are real. The elements of the accumulation apparatus 230 and correlator 200 may be duplicated for additionally processing an imaginary component of data values which are complex. For example, real and imaginary components of such complex data values may represent in-phase and quadrature-phase components of a signal.

Although an embodiment of the ripple counter 240 has been described with reference to FIG. 3, other embodiments of the ripple counter 240 may be alternatively be used.

Although an embodiment of the adder 275 has been described with reference to FIG. 4, other embodiments of the adder 275, such as a carry look ahead adder or a carry save adder, may be alternatively be used.

For production testing of the asynchronous ripple counter 240, a built-in self test, BIST, process may be provided in which data values are provided to generate all transitions of the series of flip-flops 243a, 243b, 243c of the asynchronous ripple counter 240 whilst comparing the state of the asynchronous ripple counter 240 with, for example, a synchronous adder that can be tested by means of a full scan process. The comparison may be based on, for example, the accumulated data value at the output 245 of the accumulation apparatus 230, or the correlation values at the selection stage 415.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A correlator comprising:
   an accumulation apparatus, comprising
      a synchronous adder configured to add each current among the data values to an adder sum of preceding among the data values, the adder sum being fed back from an output of the synchronous adder; and
      an asynchronous ripple counter coupled to the adder and configured to generate a ripple count by counting occurrences of overflow of the adder,
      wherein the accumulation apparatus outputs an accumulated data value including the synchronous adder sum as least significant part and the ripple count as most significant part
   wherein the accumulation apparatus is coupled to an output of a product and bias stage, the product and bias stage including
      an input stage configured to provide correlator input signal samples of the correlator input signal and the negative of the correlator input signal samples;
      a bias stage configured to add a bias value to the correlator input signal samples and the negative of the correlator input signal samples to generate, respectively, biased correlator input signal samples and biased negative of the correlator input signal samples;
      a code generator configured to generate a pseudo-random code comprising symbols having first and second values; and
      a multiplexer configured to generate the data values by selecting one of the biased correlator input signal samples in response to each symbol of the pseudo-random code having the first value and selecting one of the biased negative of the correlator input signal samples in response to each symbol of the pseudo-random code having the second value.

2. The correlator of claim 1, further comprising a bias removal stage coupled to an output of the accumulation apparatus and configured to generate a correlator output value by subtracting, from the accumulated data value, an accumulated bias equal to the bias value multiplied by the number of data values.

3. The correlator of claim 1, wherein the bias value is a power of two.

4. A wireless communication device comprising the correlator as claimed in claim 1.

5. The correlator of claim 1, wherein the asynchronous ripple counter includes at least a first and second flip-flop, a first output of the first flip-flop is connected to a clock input of the second flip-flop, the first output of the first flip-flop is output from the asynchronous ripple counter as a least-significant bit of the ripple count, and the first flip-flop includes a second output coupled an input of the first flip-flop.

6. The correlator of claim 1, wherein the adder receives an N-bit value and outputs the adder sum as an N+1-bit value, and the adder includes N+1 adders stages respectively coupled to N+1 flip-flops.

7. The correlator of claim 1, wherein
   the synchronous adder comprises a plurality of adder stages respectively coupled to a corresponding plurality of flip-flops,
   at least one of the plurality of adder stages includes a carry-in input coupled to a carry-out output of another one of the plurality of adder stages, a second input coupled to receive a sub-input of the accumulation apparatus, a third input, a sum output, and a carry-out output coupled to the asynchronous ripple counter,
   a flip-flop corresponding to the one of the plurality of adder stages includes an input coupled to the sum output of the at least one of the plurality of adder stages, and an output coupled to provide an output of the accumulation apparatus and coupled to the third input of the at least one of the plurality of adder stages.

8. The correlator of claim 1, wherein
   the synchronous adder comprises a plurality of adder stages respectively coupled to a corresponding plurality of flip-flops,
   at least one of the plurality of adder stages includes a carry-in input coupled to a carry-out output of another one of the plurality of adder stages, a second input, and a sum output,
   a flip-flop corresponding to the one of the plurality of adder stages includes an input coupled to the sum output of the at least one of the plurality of adder stages, a first output coupled to the second input of the at least one of the plurality of adder stages, and a second output coupled to the asynchronous ripple counter.

9. A wireless communication device comprising:
a plurality of correlators, each correlator including
an accumulation apparatus for accumulating a number of data values, the accumulation apparatus including a synchronous adder configured to add each current among the data values to a synchronous adder sum of preceding among the data values, the synchronous adder sum being fed back from an output of the synchronous adder, and an asynchronous ripple counter coupled to the synchronous adder and configured to generate a ripple count by counting occurrences of overflow of the synchronous adder, wherein the accumulation apparatus outputs an accumulated data value including the synchronous adder sum as least significant part and the ripple count as most significant part; and
a product and bias stage coupled to the accumulation apparatus, the product and bias stage including an input stage configured to provide correlator input signal samples of the correlator input signal and negative of the correlator input signal samples, a bias stage configured to add a bias value to the correlator input signal samples and the negative of the correlator input signal samples to generate, respectively, biased correlator input signal samples and biased negative of the correlator input signal samples, a code generator configured to generate a pseudo-random code including symbols having first and second values, and a multiplexer configured to generate the data values by selecting one of the biased correlator input signal samples in response to each symbol of the pseudo-random code having the first value and selecting one of the biased negative of the correlator input signal samples in response to each symbol of the pseudo-random code having the second value,
wherein the input stage and the bias stage are common to each of the plurality of correlators.

10. The wireless communication device of claim 9, wherein the asynchronous ripple counter includes at least a first and second flip-flop, a first output of the first flip-flop is connected to a clock input of the second flip-flop, the first output of the first flip-flop is output from the asynchronous ripple counter as a least-significant bit of the ripple count, and the first flip-flop includes a second output coupled an input of the first flip-flop.

11. The wireless communication device of claim 10, wherein the adder receives an N-bit value and outputs the adder sum as an N+1-bit value, and the adder includes N+1 adders stages respectively coupled to N+1 flip-flops.

12. The wireless communication device of claim 9, wherein
the synchronous adder comprises a plurality of adder stages respectively coupled to a corresponding plurality of flip-flops,
at least one of the plurality of adder stages includes a carry-in input coupled to a carry-out output of another one of the plurality of adder stages, a second input coupled to receive a sub-input of the accumulation apparatus, a third input, a sum output, and a carry-out output coupled to the asynchronous ripple counter,
a flip-flop corresponding to the one of the plurality of adder stages includes an input coupled to the sum output of the at least one of the plurality of adder stages, and an output coupled to provide an output of the accumulation apparatus and coupled to the third input of the at least one of the plurality of adder stages.

13. The wireless communication device of claim 9, wherein
the synchronous adder comprises a plurality of adder stages respectively coupled to a corresponding plurality of flip-flops,
at least one of the plurality of adder stages includes a carry-in input coupled to a carry-out output of another one of the plurality of adder stages, a second input, and a sum output,
a flip-flop corresponding to the one of the plurality of adder stages includes an input coupled to the sum output of the at least one of the plurality of adder stages, a first output coupled to the second input of the at least one of the plurality of adder stages, and a second output coupled to the asynchronous ripple counter.

14. The wireless communication device of claim 9, further comprising a bias removal stage coupled to an output of the accumulation apparatus and configured to generate a correlator output value by subtracting, from the accumulated data value, an accumulated bias equal to the bias value multiplied by the number of data values.

15. A method, comprising:
providing correlator input signal samples of a correlator input signal and a negative of the correlator input signal samples;
adding a bias value to the correlator input signal samples and the negative of the correlator input signal samples to generate, respectively, biased correlator input signal samples and biased negative of the correlator input signal samples;
generating a pseudo-random code comprising symbols having first and second values;
generating data values by selecting one of the biased correlator input signal samples in response to each symbol of the pseudo-random code having the first value and selecting one of the biased negative of the correlator input signal samples in response to each symbol of the pseudo-random code having the second value;
providing the data values to an accumulator having a synchronous adder and an asynchronous ripple counter;
adding, in the synchronous adder, each current among data values to a synchronous adder sum of preceding among the data values, the synchronous adder sum being fed back from an output of the synchronous adder;
generating a ripple count by counting in the asynchronous ripple counter occurrences of overflow of the adder; and
providing an accumulated data value having the synchronous adder sum as least significant part and the ripple count as most significant part.

16. The method of claim 15, wherein the generation of the ripple count by counting in the asynchronous ripple counter occurrences of overflow of the adder involves providing a first output of a first flip-flop of the asynchronous ripple counter to a clock input of a second flip-flop of the asynchronous ripple counter, providing the first output of the first flip-flop as an output from the asynchronous ripple counter as a least-significant bit of the ripple count, and providing a second output from the first flip-flop to an input of the first flip-flop.

17. The method of claim 16, wherein the adder operates by receiving an N-bit value and outputting the adder sum as an N+1-bit value using N+1 adders stages respectively coupled to N+1 flip-flops.

18. The method of claim 15, wherein the synchronous adder comprises a plurality of adder stages respectively coupled to a corresponding plurality of flip-flops, the method further comprising:
- receiving, via a carry-in input of at least one of the plurality of adder stages, a carry-out output of another one of the plurality of adder stages,
- receiving, via a second input of the one of the plurality of adder stages, a sub-input of the accumulation apparatus;
- providing, via a carry-out output of the one of the plurality of adder stages, an output to the asynchronous ripple counter;
- receiving, by a flip-flop corresponding to the one of the plurality of adder stages, a sum output of the at least one of the plurality of adder stages; and
- providing, via an output of the flip-flop corresponding to the one of the plurality of adder stages, an output of the accumulation apparatus and an output to a third input of the at least one of the plurality of adder stages.

19. The method of claim 15, wherein the synchronous adder comprises a plurality of adder stages respectively coupled to a corresponding plurality of flip-flops, the method further comprising:
- receiving, via a carry-in input of at least one of the plurality of adder stages, a carry-out output of another one of the plurality of adder stages;
- receiving, by a flip-flop corresponding to the one of the plurality of adder stages, a sum output of the at least one of the plurality of adder stages;
- providing, by a first output of the flip-flop corresponding to the one of the plurality of adder stages, an output to a second input of the at least one of the plurality of adder stages; and
- providing, by a second output of the flip-flop corresponding to the one of the plurality of adder stages, an output to the asynchronous ripple counter.

* * * * *